No. 769,477. PATENTED SEPT. 6, 1904.
T. E. GRAY.
HAT STRETCHER AND SHAPER.
APPLICATION FILED MAY 28, 1904.
NO MODEL.
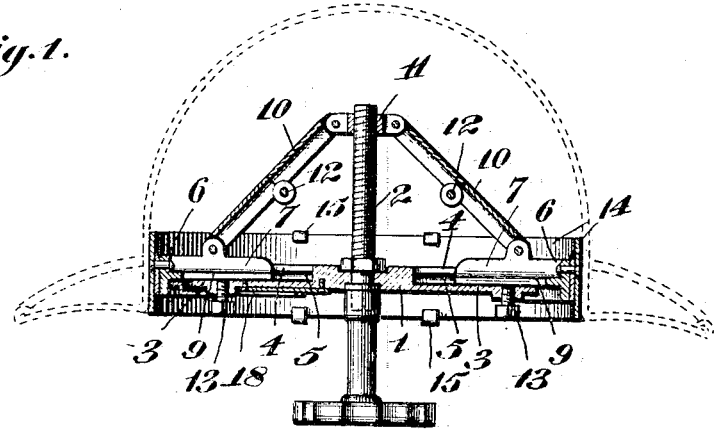

No. 769,477.

Patented September 6, 1904.

UNITED STATES PATENT OFFICE.

THOMAS E. GRAY, OF CHICAGO, ILLINOIS.

HAT STRETCHER AND SHAPER.

SPECIFICATION forming part of Letters Patent No. 769,477, dated September 6, 1904.

Application filed May 28, 1904. Serial No. 210,222. (No model.)

*To all whom it may concern:*

Be it known that I, THOMAS E. GRAY, a citizen of the United States of America, residing at Chicago, in the county of Cook and State of Illinois, have invented certain new and useful Improvements in Hat Stretchers and Shapers, of which the following is such a full, clear, and exact description as will enable others skilled in the art to which it appertains to make and use the same, reference being had to the accompanying drawings, forming a part hereof.

The object of this invention is to provide an inexpensive and easily-operated device by the use of which hats may be stretched uniformly in all directions, so as to preserve the original shape, or may at will be stretched more or less at any desired point, so as to conform to the shape of the wearer's head.

This object is accomplished by the use of the device illustrated in the accompanying drawings; and the invention consists in certain novel features of the same, as will be hereinafter first fully described and then particularly pointed out in the claims.

In the accompanying drawings, which illustrate the preferred embodiment of my invention, Figure 1 is a vertical sectional view, the hat being indicated in dotted lines in order to illustrate the position of the device when in use. Fig. 2 is a similar view showing the device as it appears when operated to stretch the hat at one side. Fig. 3 is a bottom plan view. Fig. 4 is a detail section on the line $x\ x$ of Fig. 3. Fig. 5 is a detail section on the line $y\ y$ of Fig. 3, and Fig. 6 is a detail vertical section of the spring-band.

In carrying out my invention I employ a four-armed body 1, in the center of which is swiveled a threaded spindle 2, the lower end of said spindle being angular for engagement by a wrench or operating-key. The arms 3 of the body 1 extend outward to the sides and ends of the device and are constructed with longitudinal slots 4 in their upper sides, communicating with the internal grooves 5, as shown, the said slots and grooves extending to and through the extremities of the arms. Slidably mounted in the said grooves are the stretcher-heads 6, consisting of shanks or stems 7, fitted in the grooves and wings 8, extending in opposite directions from the outer ends of the shanks or stems. The wings are curved, as shown clearly in Fig. 3, so that the four stretcher-heads together present an elliptical outline corresponding to the usual shape of hats. The stems are provided with ribs 9 on their upper sides, which project through the slots 4, and levers 10 have their lower ends pivoted to the said ribs, the upper ends of said levers being pivoted to a spider or collar 11, mounted on the spindle 2. As the spindle is rotated the spider or collar is caused to move up or down, and thereby actuate the levers, so as to force the stretcher-heads in or out. These levers are constructed with hinge-joints 12 at their centers, and set-screws 13 are mounted in the bottoms of the arms 3 of the body and adapted to bear against the stems of the stretcher-heads, so as to bind the same within the grooves of the said arms. If it is desired to stretch the hat at only one side or one end, all the set-screws except the one at that side or end are turned home, so as to hold the respective stems against movement. Then when the spindle is rotated the unsecured stretcher-head will move outward, as usual, while the others will remain stationary, and the levers connected therewith will bend at their central hinge-joints, as shown in Fig. 2. Secured centrally to each of the stretcher-heads is a spring-band 14, the ends of which are free. These several bands overlap, and the extremities of the end bands are provided with lips or hooks 15, which engage the upper and lower edges of the side bands, and thereby hold the several bands together, so as to form an extensible ring adapted to bear against the inner side of the hat in the operation of the device. In the ends of the end stretcher-heads are mounted set-screws 16, which are adapted to bear against the bands and be turned out to force the same outward, so that, if desired, the ends of the hat may be given an approximately square form.

On the under sides of the arms I provide scales 17, which are marked successively with hat sizes or fractional inch numbers, and to the stretcher-heads I secure indexes or pointers 18, which consists of slotted plates fitting over the bearings for the set-screws 16 and bearing close against and playing over the scales 17, so as to permit the size to which the stretcher is adjusted to be read at a glance.

The operation of the device will be readily understood. The stretcher is placed in the hat to be stretched with the spindle and the connected levers passing up within the crown of the hat and the spring-band bearing the sweat-band of the hat. A key or wrench is then applied to the lower angular end of the spindle and rotated, so as to cause the spider thereon to move downward, thereby forcing the lower ends of the levers outward and causing the stretcher-heads to move outward and press forcibly against the spring-band, so as to expand the same. This expansion of the spring-band is transmitted directly to the hat, so as to stretch the same. As the hat is stretched the index-plates are moved outward over the scales, so that the operator may know instantly when the hat has been stretched to the proper size. Should it be desired to further stretch the hat at any point, the set-screws are turned home, so as to prevent movement of all the stretcher-heads except the one bearing upon the point at which the stretching is to be done, after which the spindle is rotated as before. Should it be desired to alter the shape of one or both ends of the hat, the set-screws in the end stretcher-heads are manually turned, so as to force out the spring-band at the proper point, as will be readily understood.

It will be observed that the device is simple in its construction and arrangement of parts, occupies but little space, and can be readily manipulated by any one. The four sections of the spring-band overlap, so as to form an extensible ring and present a smooth surface to the sweat-band of the hat being stretched. By the use of the device a new hat can be quickly made to fit the head of a purchaser, as it is only necessary to place the device within the old hat and expand the ring, so as to note the size and the points where there may be departures from the regular shape. The device is then inserted in the new hat and manipulated, as before described and as will be readily understood, to stretch the hat to the desired size and shape.

Having thus described my invention, what I claim, and desire to secure by Letters Patent, is—

1. In a hat-stretcher, the combination of a body having radial arms, stretcher-heads slidably mounted on said arms, means mounted on the body for moving said heads, and means for securing each of the heads in its adjusted position.

2. In a hat-stretcher, the combination of a body having radial arms provided with internal grooves and slots in their upper sides, stretcher-heads having stems fitting in said grooves and provided with ribs engaging said slots, set-screws mounted in the bottom of said arms and adapted to bind against the said stems, and means for moving the stretcher-heads.

3. In a hat-stretcher, the combination of the body, the stretcher-heads slidably mounted on the body, set-screws mounted in the body and bearing against the said heads, a threaded spindle swiveled centrally in the body, a collar or spider on the spindle, and jointed levers having their upper ends pivoted to said spider and their lower ends pivoted to the stretcher-heads.

4. In a hat-stretcher, the combination with the body and the stretcher-heads mounted thereon, of a rotary spindle swiveled centrally in the body, a collar or spider mounted on said spindle, and levers having their upper ends pivoted to said spider and their lower ends pivoted to the stretcher-heads.

5. In a hat-stretcher, the combination of the body, the stretcher-heads mounted thereon, means for moving said heads, and a spring-band carried by each of said heads, the ends of the several bands overlapping and the extremities of the end bands being provided on their upper and lower edges with integral lips engaging the upper and lower edges of the side bands.

In testimony whereof I have signed this specification in the presence of two subscribing witnesses.

THOMAS E. GRAY.

Witnesses:
  CHARLES W. HOFF,
  CHARLES F. PARKER.